July 31, 1962 G. L. GROVE ETAL 3,046,710
COOLING DEVICE FOR MACHINE TOOL MEMBER
Filed April 22, 1960
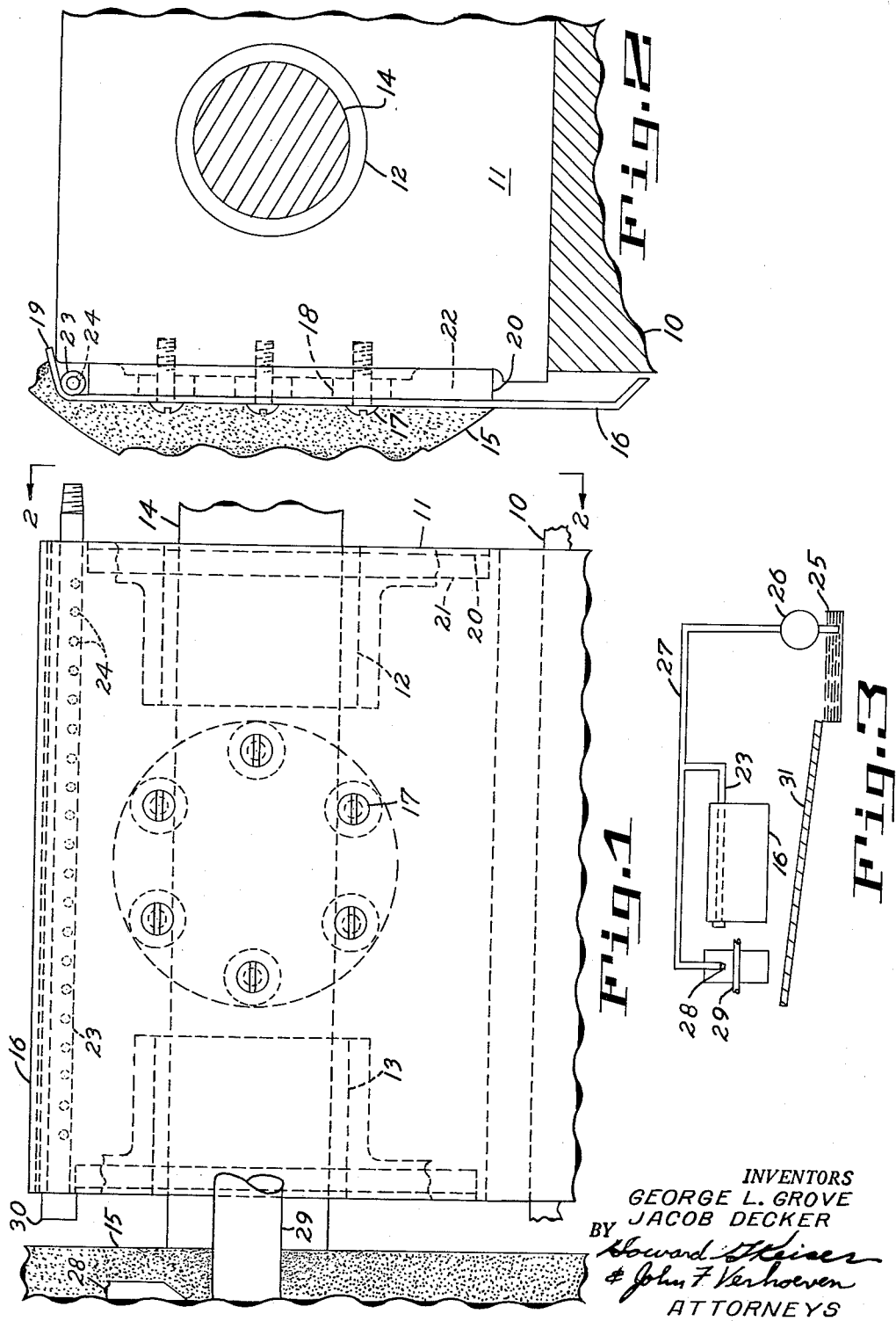
INVENTORS
GEORGE L. GROVE
JACOB DECKER
BY
ATTORNEYS United States Patent Office 3,046,710
Patented July 31, 1962

3,046,710
COOLING DEVICE FOR MACHINE TOOL MEMBER
George L. Grove and Jacob Decker, Cincinnati, Ohio, assignors to The Cincinnati Milling Machine Co., Cincinnati, Ohio, a corporation of Ohio
Filed Apr. 22, 1960, Ser. No. 24,069
2 Claims. (Cl. 51—266)

The present invention relates to cooling in machine tools.

During operation certain portions of a machine tool will be subjected to heat which will raise the temperature of said portions substantially and cause expansion thereof. Such expansion is, of itself, undesirable because it can affect the accuracy of the forming operation but, generally, the most deleterious effect on forming accuracy will occur when the temperatures within a single portion of the machine fluctuate in different amounts to cause a misalignment of the parts carried thereby.

For example, in a typical grinding machine, the wheelhead has bearings at each end which support a spindle extending through the wheelhead, the spindle carrying a grinding wheel adjacent one end of the wheelhead. The wheelhead, which is subjected to considerable heat generated in the bearings, is also subjected to irregular external cooling effects since the coolant poured over the workpiece at the grinding wheel is sprayed onto the wheelhead primarily at the end adjacent the grinding wheel. Thus, the far end of the wheelhead will heat up substantially more than the end adjacent the grinding wheel, causing misalignment of the grinding wheel spindle.

With the device of the present invention, even, effective cooling of a heated portion of a machine tool can be accomplished. In the preferred form of the invention a plate is mounted on the heated portion, such as the wheelhead, in spaced relation to the side of the wheelhead exposed to the irregular cooling effects, such as the grinding operation. The plate extends over the entire side of the wheelhead and defines, with the side of the wheelhead, a chamber in communication with the wheelhead and in registration with both the bearings therein. A conduit having a plurality of small, closely spaced, holes directed to the side of the wheelhead extends across the top of the chamber. The conduit is connected into the coolant system so that a sheet of coolant is deposited over the side of the heated wheelhead adjacent each of the bearings. The form in which the coolant is deposited on the wheelhead promotes evaporation thereof as it flows down the surface of the wheelhead and a relatively small amount of coolant is required for the amount of heat removed from the wheelhead and bearings thereof.

In the preferred form of the invention the plate which forms one side of the chamber shields the side of the heated portion from any external irregular cooling effects and confines the coolant directed on the side of the wheelhead so that no spray or vapor therefrom is deposited on other portions of the machine. Moreover, the plate serves to condense the coolant which vaporizes so that liquid coolant drains out of the chamber and is returned to the coolant system.

It is therefore one object of the present invention to provide a device for cooling a portion of a machine tool by evaporation of liquid thereon.

It is another object of the present invention to provide a device for the even cooling of a portion of the machine tool which shields said portion from external irregular cooling effects.

It is still another object of the present invention to provide a device for removing heat from a portion of the machine utilizing a relatively small amount of coolant which can be supplied from the coolant supply used to remove heat generated in the forming operation.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 1 is an elevational view of the device of the present invention connected to one side of the wheelhead of a centerless grinding machine;

FIG. 2 is a view taken on the line 2—2 of FIG. 1; and

FIG. 3 is a schematic diagram showing the coolant system of the grinding machine.

There is shown in FIGS. 1 and 2 the base 10 of a grinding machine on which is mounted the wheelhead 11 having bearings 12 and 13 mounted in the respective ends thereof. A spindle 14 is carried by the bearings and extends through the wheelhead. A grinding wheel 15 is mounted on one end of the spindle adjacent one end of the wheelhead for operation on a workpiece 29. A plate 16 is connected to the surface of the wheelhead exposed to the operation by screws 17 and is spaced therefrom by spacers 18 received on the screws between the plate and the wheelhead. The plate 16 has a top flange 19 and side flanges 20. Rubber strips 21 are sandwiched between the plate and the wheelhead along the flanges 20 and seal the ends of the chamber 22 defined by the plate and the wheelhead without transmitting heat from the wheelhead to the plate. The chamber 22 is open at the bottom and extends over the entire side of the wheelhead and is therefore in registration with both the bearings 12 and 13 thereof.

A conduit 23 is spot welded to the plate 16 at the top of the chamber and extends along the side of the wheelhead. The conduit has a plurality of closely spaced small holes 24 therein directed toward the side of the wheelhead, and one end is closed by cap 30, so that coolant entering the other end of the conduit is deposited in a thin sheet down the side surface of the wheelhead adjacent both of the bearings. With the coolant so distributed over the heated wheelhead, evaporation of the coolant is promoted and heat is drawn from the wheelhead (and hence the bearings) by the evaporation of the liquid coolant. By way of example, in an actual installation a conduit having holes one-eighth inch in diameter spaced one inch apart, and directed downward toward the side of the wheelhead at a 45 degree angle, was utilized.

A conventional grinding machine coolant system includes a source of water base coolant 25, a pump 26 to supply coolant to a pressure line 27, and a nozzle 28 connected to the pressure line to discharge coolant on the workpiece 29 and the grinding wheel at the operation as shown in FIG. 3. Although water can be used as a coolant in the present invention, the inlet end of conduit 23 can be connected to pressure line 27 to utilize the regular coolant supply of the machine since a relatively small amount of coolant is required.

Plate 16 is substantially cooler than the wheelhead and coolant which vaporizes condenses thereon. This coolant, as well as coolant that is not evaporated in the chamber, drains from the chamber out the bottom thereof into a gutter 31 which also receives the coolant poured over the workpiece at the grinding operation. From the gutter the coolant is returned to the source 25.

What is claimed is:

1. In a machine tool for performing a liquid cooled operation on a workpiece, the machine tool having a surface subjected to generated heat and in the path of the liquid sprayed from the operation, the combination comprising a source of aqueous coolant, a plate extending over said surface and spaced therefrom to shield said surface from said sprayed liquid, said plate and surface defining a chamber having an opening at the bottom, a conduit in said chamber having a plurality of spaced openings directed toward said surface, means connecting said conduit to said source of aqueous coolant to deposit a thin sheet of coolant over said surface for at least partial evaporation thereby, and means to return liquid coolant draining from the bottom of the chamber to the source of coolant.

2. In a grinding machine having a liquid coolant system including a source of water base coolant and a pressure line to supply coolant to the grinding operation, a grinding wheel mounted on a spindle, and a wheelhead having bearings supporting said spindle and having at least one surface thereof in the path of the coolant sprayed from the grinding operation, the combination comprising a plate connected to the wheelhead and spaced therefrom, said plate shielding said surface from the sprayed coolant and defining a chamber in communication with said one surface of the wheelhead and in registration with the bearings therein, said chamber having an opening at the bottom, a conduit extending along the upper edge of said chamber and having a plurality of smal closely spaced holes directed on said surface of the wheelhead, means connecting said conduit to the pressure line whereby a thin sheet of coolant is deposited over said surface of the wheelhead adjacent the bearings and evaporation of said coolant draws heat equally from said bearings, and means to return liquid coolant draining from the bottom of the chamber to the pressure line.

References Cited in the file of this patent
UNITED STATES PATENTS

| | | |
|---|---|---|
| 1,782,235 | Kearney et al. | Nov. 18, 1930 |
| 2,921,364 | Petzoldt | Jan. 19, 1960 |